3,252,621
FUEL DISPENSING SYSTEM
Dean O. Miller, P.O. Box 550, and Howard E. Sturgeon, 3840 Summers Lane, both of Klamath Falls, Oreg.
Filed Nov. 13, 1964, Ser. No. 410,893
10 Claims. (Cl. 222—26)

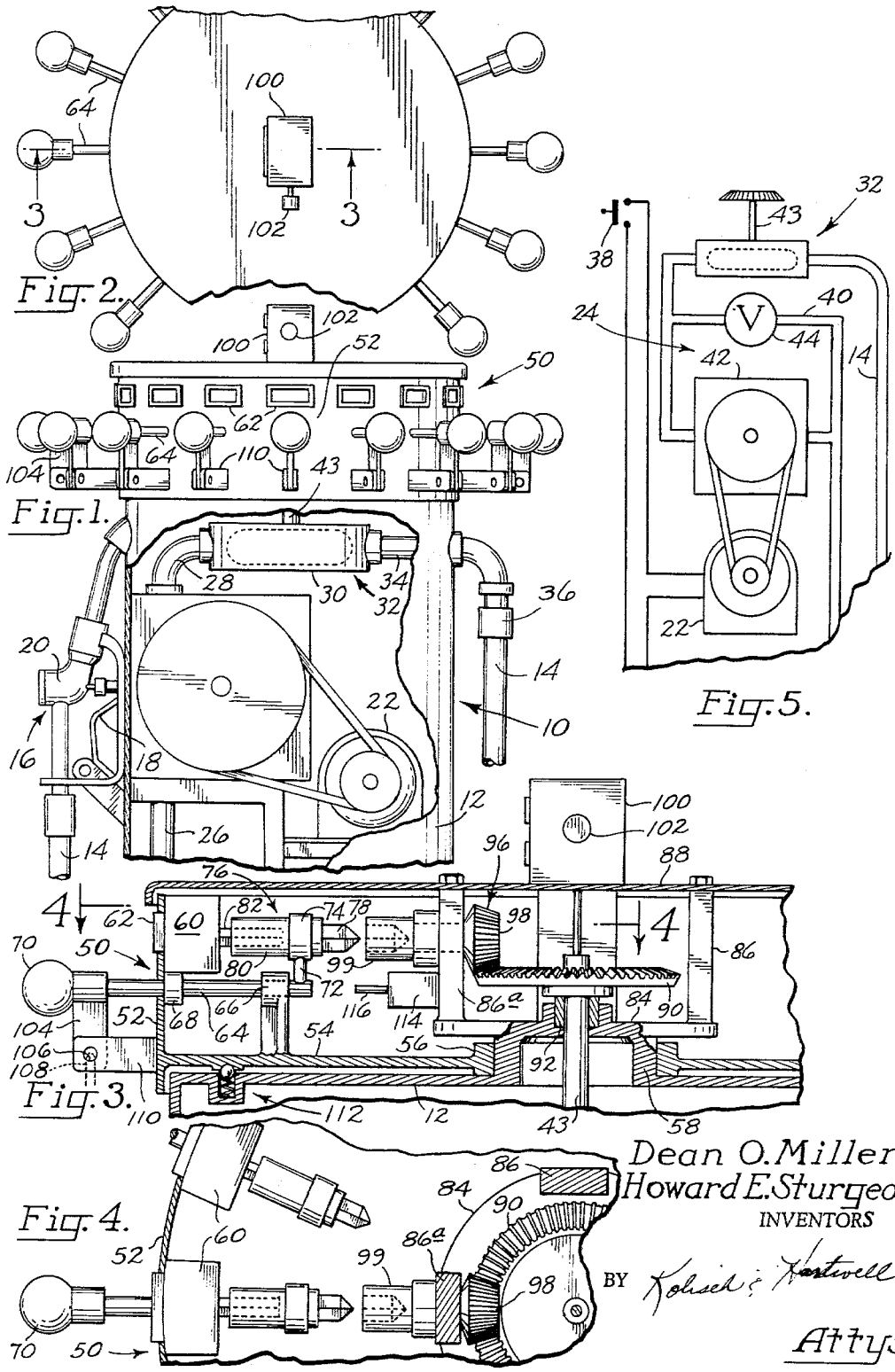

This invention relates to distributing mechanism for fluids, and more particularly to distributing mechanism such as may be used in the dispensing of motor fuel and the like, including multiple recorders for recording volumes of fuel dispensed, and means for operating specific ones of these recorders independently of others.

In United States Patent 2,963,200, there is disclosed a pumping stand for dispensing fuel such as might be provided at a filling or service station, having multiple recorders for recording volumes pumped, and means whereby selected ones of these recorders may be made operative. In general terms, this invention features improvements over apparatus of the type disclosed in the above-identified patent.

Fuel distributing mechanism having a recorder for each account that uses the mechanisms may be used advantageously by gasoline and diesel fuel dispensers in the handling of large volume accounts. With suitable provision made to prevent unauthorized personnel from drawing fuel, the dispensing mechanism is particularly suited for 24-hour a day operation, as continuous supervision by an attendant is not necessary. Customers drawing fuel from a dispensing system with an individual recorder for their account also appreciate the ability of such a system to keep an accurate record of total fuel consumed in any given period. A private concern may advantageously use the dispensing system of the invention in the fueling of several different pieces of equipment, by allocating for each piece of equipment a separate recorder, and in this manner at the end of a given period the customer has an accurate account of the exact amount of fuel consumed by each piece of equipment.

Thus, a general object of this invention is to provide improved fluid-distributing mechanism which features multiple recorders, and means for operatively connecting selected ones of the recorders to a flow meter or similar means responsive to fluid flow, whereby over a given period a broken down record may be maintained of the fluid distributed by the mechanism.

More specifically, an object is to provide such distributing mechanism featuring an improved construction whereby in a given sized stand, a greater number of selectively operated recorders may be installed than possible with prior known devices of a similar nature.

A further object is to provide fluid-distributing mechanism featuring a simpler construction than that which characterizes constructions known to date, the mechanism in addition to its simplicity being relatively trouble free in operation.

In the mechanism contemplated by the invention, mechanical means may be employed to connect, selectively, different ones of multiple recorders to a gear or other member which is rotated in response to fluid flowing through the mechanism, as by a meter or other means. To enable a maximum number of recorders to be connected by such a mechanical system to the meter, a clutch part journaled in a stationary position within a housing is provided, which is connected to the gear to be driven by such gear. Surrounding this clutch part is a rotatable hollow housing, having selector members mounted thereon projecting out from the housing, which are pushed in, selectively, to produce a connection between a recorder and the clutch part mentioned.

The housing is rotated to place a given recorder and the selector member controlling its operation in what is referred to as a preparation station, such station being the same for all the selector members and their associated recorders. With a given recorder in this station, the selector member associated with the recorder may be pushed inwardly relative to the housing, to shift another clutch part mounted on the member into engagement with the clutch part driven by the meter. With such engagement, and because this other clutch part is connected to the recorder to operate the recorder, when the gear is rotated on fluid flowing in the system, the recorder records the volume of fuel pumped.

The distributing mechanism further may comprise a switch for regulating operating periods of any pump which pumps the fuel or other fluid, mounted in a stationary position along with the clutch part connected to the gear. This switch is actuated to start the pump, upon a recorder being placed in the preparation station and its selector member shifted to connect the recorder to said first-mentioned clutch part.

With the mechanism described, a substantial portion of the drive mechanism for the recorders is common to all recorders, namely, the stationarily located clutch part described and its gear connection with the flow meter. That part of the drive mechanism connecting the meter to each recorder which is separate from each recorder is the mating clutch part and its connection to the recorder. With this organization, a substantial number of recorders together with a selector member for placing each in operative position may be provided on a rotatable housing, as described, with minimal clearance problems introduced within the housing.

Various other features and objects of the invention will become more fully apparent as the following description is read in conjunction with the accompanying drawings, wherein:

FIG. 1 is a side view, partly broken away, of upper portions of a pumping stand incorporating the invention, and showing at the top of the stand a cylindrical hollow housing mounting mutiple recorders and selector numbers for these recorders;

FIG. 2 is a top view of portion of the pumping stand shown in FIG. 1;

FIG. 3 is a cross-sectional view, somewhat enlarged, taken generally along the line 3—3 in FIG. 2;

FIG. 4 is a cross-sectional view taken generally along in the line 4—4 in FIG. 3, further illustrating the mechanism shown in FIG. 3; and FIG. 5 is a schematic view illustrating details of how pumping periods may be controlled in the stand.

Referring now to the drawings, and first of all more particularly to FIG. 1, a pumping stand of the type adapted to dispense fuel in a service station is shown at 10, comprising a base housing and frame 12 which rests on the ground in the usual manner. A hose 14 is utilized for delivering fuel to a vehicle's fuel tank, such being shown with an intermediate portion removed in FIG. 1. The hose terminates in a valve-controlled nozzle portion 16, of the type designed to be inserted into the inlet of a vehicle's fuel tank. A handle 18 is manipulated to control fuel flow through the nozzle portion, by opening and closing a valve 20.

Within the base housing there may be provided an electric motor, such as that indicated at 22 for driving a pump unit 24. The intake for the pump unit is connected by pipe 26 to the usual fuel tank, which ordinarily is buried in the ground. The discharge side of the pump unit connects with a pipe 28 communicating with the interior of a housing 30 of a fluid flow meter 32. Also communicating with the interior of housing 30 is a pipe 34 which is connected by coupling 36 to hose 14. Pipe section 28, housing 30, and pipe 34 together with hose 14 constitute a fuel-distributing conduit in the mechanism.

During operation of the pumping stand, motor 22 may be started to drive pump unit 24. Referring now also to FIG. 5, switch 38 in the electric supply circuit for the electric motor is closed to start the motor and thus to start operation of the pump unit. Fuel is not discharged from the distributing conduit until valve 20 in nozzle portion 16 is opened. Thus, a bypass 40 is provided for the pump unit, to enable circulation of fuel between intake and discharge sides of pump 42 in the unit with valve 20 closed. This bypass includes a conventional pressure-responsive relief valve 44.

Flow meter 32 is of conventional design, and includes a rotor member within the housing which rotates at a speed related to the flow of fuel through the housing. The rotor member drives a shaft 43 projecting upwardly from the meter which likewise rotates at a speed related to the flow rate of fuel through the distributing conduit.

According to this invention and now referring to FIGS. 1, 2, 3, and 4, a hollow housing or mounting 50 is rotatably mounted on the top of base housing and frame 12. In the embodiment of the invention illustrated, this comprises a substantially cylindrical wall 52 forming the sides of the housing, a base 54, and a bearing portion 56 which journals the housing for rotation about an upright axis on journal portion 58 joined to frame 12. Mounted on wall 52 of housing 50 are plural recorders 60 substantially equally circumferentially spaced about the housing.

The recorders are conventional in construction. Each may include the usual dials that are rotated by suitable mechanism in the recorder, and that by their positions indicate volume of fuel discharged through the distributing conduit while the recorder is in operation. The dials of the various recorders are viewable through windows such as window 62 exposed on the outside of housing 50.

As indicated above, according to this invention each recorder may be connected selectively to the flow meter, so that at any given time during which fuel is being pumped, only one of the recorders 60 is recording the amount of fuel dispensed. A specific recorder is connected to the flow meter to make it operative by rotating the housing to place the recorder in what is termed herein a preparation station, and then connecting the recorder to the flow meter in the manner and by the means which now are to be described.

Mounted beneath each recorder, and disposed generally radially with respect to the center axis of cylindrical housing 50, is a push-pull rod or selector member 64. Each has an inner end slidably received in a guide 66 supported on housing base 54. The rods project through housing wall 52, and are supported between their ends in a mounting 68 secured to wall 52. Exposed outer ends of the rods mount knobs 70 provided to facilitate manipulation of the rods, by sliding them manually in and out.

Projecting upwardly from the inner end of each rod 64 is a post 72 having a bearing 74 joined to the top which rotatably supports an elongated coupling element 76. This coupling element terminates at one end (the right end in FIG. 3) in a square shaft 78 which is also referred to herein as a clutch part. The opposite end of the coupling element comprises a socket portion 80, slidably but nonrotatably receiving a square shaft 82 projecting inwardly from the back side of a recorder. With this construction, movement of the coupling element in a direction extending radially of housing 50 is accommodated, with the element at all times connected to a recorder, so that on rotation of the element within bearing 74, the recorder is operated through its shaft 82.

Substantially centrally of housing 50, and held in a stationary position through joinder with portion 58 of the base housing or frame, is a platform 84. Distributed around the margin of the platform are stationary posts 86 which project up from the platform and provide a support for a cover 88 joined to the top ends of the posts which extends over the top of housing 50. Within the space bounded by the posts, and above the platform, is a bevel gear 90 occupying substantially a horizontal plane. Shaft 43 of the flow meter referred to earlier extends upwardly through the platform (it being journaled at 92), and is joined to bevel gear 90.

In the embodiment of the invention herein disclosed, a preparation station for a particular recorder is selected, wherein that recorder is located on the side of the pumping stand which mounts nozzle portion 16, i.e., the left side of the stand as viewed in FIGS. 1 through 4. Post 86a faces this side of the stand, and this post, therefore, is utilized to mount a power-transmitting element 96 which is journaled in the post. This element comprises at one end a bevel gear 98 with teeth meshing with the teeth of gear 90, and at its other end a socket 99 (also referred to herein as a clutch part) adapted slidably to receive square shaft 78 of a coupling element when such is shifted toward the socket. Gears 98 and 90, together with shaft 33, thus constitute members that rotate when fluid flow occurs in the distributing conduit, and whether such rotation is transmitted to a recorder depends upon which recorder is connected to the members through the power-transmitting and coupling elements described.

A master recorder 100 may be provided on the top of cover 88 having the usual dials registering total volume of fuel pumped by the stand. This recorder may also be provided with another set of dials which are capable of resetting to zero position, as by adjusting knob 102, for showing volume pumped after each resetting.

In order to prevent unauthorized persons from receiving fuel from the pumping stand, each push-pull rod or selector member includes a bracket 104 secured thereto and extending down from the rod outside hollow housing 50. This bracket includes an aperture at its bottom end that registers with apertures 106 in paired bars 110 joined to housing 50 beneath each selector member. The various apertures receive the shackle 108 of a padlock when it is desired to lock a selector member in a position retracted from housing 50. On removal of the padlock, the bracket and the rod to which it connects is free to be shifted inwardly, to produce a corresponding movement in the coupling element which is mounted on the rod inside the housing.

Indent-detent means 112 may be provided between hollow housing base 54 and frame 12, to facilitate accurate positioning of each recorder and its push-pull rod in the preparation station described.

Mounted on platform 84 adjacent power-transmitting element 96 is a switch housing 114, having an actuating finger 116 projecting out from the front of the housing. With a selector member positioned adjacent element 96 and in the preparation station, and on pushing the member in to place its shaft 78 in socket 99, the inner end of the selector member pushes in on finger 116 to actuate the switch within the housing, said switch being switch 38 already described and shown in FIG. 5.

Generally describing the operation of the pumping stand disclosed, and assuming that the stand is used in a 24-hour a day filling station, where different vehicle operators dispense the fuel they need themselves and without supervision from a station operator, each customer to use the stand would be assigned a separate recorder, and be provided with a key to the padlock which unlocks the selector member associated with the recorder. The housing is rotatable without unlocking any selector member, but until switch 38 is actuated, it is impossible to pump fuel. When a given customer wishes to pump fuel, he rotates the housing to place his assigned recorder and the push-pull rod associated therewith in the preparation station for the stand, which is with these elements above nozzle portion 16 and opposite post 86a. With unlocking of the padlock, the push-pull rod may be moved radially inwardly on the housing, with corresponding movement in coupling element 76 to place shaft 78 of the element inside socket 99. This completes a drive line from the flow meter and through the bevel gear to the recorder. With completion of this drive line, the inner end of the push-pull rod engages finger 116 to close switch 38, which results in operation of the pump and motor. Fuel flow through the distributing line does not occur until valve 20 is opened, and at this time the flow meter operates with corresponding operation of the recorder connected to the flow meter.

When a customer completes use of the pumping stand, he may retract his selector member to open up switch 38 and break the power-transmitting line between the flow meter and his recorder. By reinserting his padlock, he then may be assured that no one else will utilize his recorder while obtaining fuel.

It should be noted that with the means disclosed, power transmitting element 96, the bevel gears, and associated structure are used in the connection of the flow meter with all of the recorders. This greatly simplifies the construction of the pumping stand. Further, a much more compact organization is possible, than were a separate drive gear arrangement to be provided for each recorder. With the rotatable housing, each customer can view his recorder, with the recorder positioned advantageously for such viewing, i.e., directly below the normal at-rest position for nozzle portion 16.

While a specific embodiment of the invention has been described, it should be apparent that changes and variations are possible without departing from the invention. Accordingly, it is desired to cover all modifications and variations of the invention as would be apparent to one skilled in the art and that come within the appended claims.

It is claimed and desired to secure by Letters Patent:

1. In fluid-distributing mechanism including a distributing conduit for handling fluid,
 a housing,
 plural spaced selector members projecting from said housing, having inner ends inside the housing, and a first clutch part for each selector member mounted on its inner end,
 a flow-responsive member rotatably mounted within the housing, and means connected to the member for rotating it when fluid flows through said conduit whereby the member is responsive to fluid flow in the conduit,
 a second clutch part operatively connected to said flow-responsive member to be driven by the member,
 means mounting the housing accommodating shifting of the housing to different positions, thus to place, selectively, different ones of said first clutch parts in a position adjacent said second clutch part,
 each of said selector members being shiftable relative to the housing and being operable, upon shifting of the member, when its said first clutch is adjacent said second clutch part, to produce engagement of the two clutch parts, and
 a recorder for recording fluid flow operatively connected to said flow responsive member through said first and second clutch parts.

2. The fluid-distributing mechanism of claim 1, wherein a recorder is provided for each selector member, connected to the second clutch part of the member, and operation of the recorder for one selector member is exclusive of operation of other recorders.

3. In fluid-distributing mechanism, including a distributing conduit for handling fluid,
 a frame,
 a mounting supported on said frame,
 plural spaced selector members mounted on said mounting having an exposed set of ends, and each being shiftable relative to said mounting through manipulation of its exposed end,
 a first clutch part mounted on each selector member,
 a second clutch part mounted on said frame,
 means mounting said arm mounting on said frame accommodating movement of the mounting, and with movement of the mounting, movement of each of said first clutch parts, selectively, into a preparation station positioned adjacent said second clutch part,
 each of said selector members being shiftable relative to said mounting to place its said first clutch part in engagement with said second clutch part, upon said first clutch part being so positioned in said preparation station adjacent said second clutch part, and
 a recorder associated with each selector member, for recording periods of fluid flow, connected to the first clutch part of each selector member and driven by the second clutch part when the first and second clutch parts are in engagement.

4. In fluid-distributing mechanism including a distributing conduit for handling fluid,
 a frame,
 a flow control switch mounted on said frame which, when actuated, produces fluid flow in said conduit,
 a mounting mounted on said frame, and plural spaced selector members mounted on said mounting having an exposed set of ends, each arm being shiftable relative to said mounting through manipulation of its exposed end,
 means mounting said mounting on said frame accommodating movement of the mounting relative to the frame, and with movement of the mounting, movement of selected ones of said selector members into a preparation station positioned adjacent said switch,
 said switch being actuatable by a selector member to start fluid flow on movement of said mounting to place one of said selector members in said preparation position adjacent said switch, and upon movement of such selector member relative to the mounting after being so positioned, and
 a recorder for each selector member made operable to record fluid flow when the selector member has started flow by actuation of said switch.

5. The fluid-distributing mechanism of claim 4, wherein there is provided for each selector member means interposed between the member and said mounting for locking the member for movement relative to the mounting.

6. The fluid-distributing mechanism of claim 5, which further comprises a rotatable member mounted on the frame, which rotates on fluid flow occurring through said conduit, a clutch part connected to said rotatable member to be driven by the member, and another clutch part for each selector member, which engages said first-mentioned clutch part on the member being placed in said preparation station and shifted relative to the housing to produce actuation of the fluid-control switch.

7. In fuel-distributing mechanism, including a distributing conduit for handling fuel, and means for pumping fuel through said conduit,
 a frame,
 a gear journaled on said frame with means for rotating the gear during periods when fluid flow occurs through said conduit,
 a hollow housing with sides surrounding said gear rotatably mounted on said frame for movement of the sides of the housing around said gear,
 plural selector members mounted on said housing having a set of ends exposed outside the housing and each having an inner end inside the housing,
 a first clutch part mounted on the inner ends of each selector member,
 a second clutch part journaled on said frame, within the housing, and connected to said gear to be rotated by the gear,
 rotation of said housing being operable to shift selected ones of said first clutch parts into a position adjacent said second clutch part, and said selector members being shiftable relative to said housing whereby, with a selected first clutch part adjacent said second clutch part, and on shifting of the selector member mounting the clutch part, the two clutch parts become engaged, and a recorder for each selector member for recording fuel pumped, said recorders being mounted on the sides of the housing and the recorder for each selector member being connected to the clutch part mounted on the member whereby when such clutch part engages said second clutch part the recorder is driven by said gear through the then engaged clutch parts.

8. The fuel-distributing mechanism of claim 7, which further comprises a switch mounted on said frame, connected to the means for pumping fuel through the conduit, whereby upon actuation of the switch pumping of fuel starts, and each selector member includes means for actuating said switch, said means of each member being operable to produce actuation of the switch only when the member has its clutch part moved into said position adjacent the second clutch part by rotation of said housing.

9. In the fuel-distributing mechanism, a pumping stand including an upright base frame with sides forming a base housing, a conduit for handling fuel extending into said base housing and a flow meter mounter within the base housing connected in series with the conduit, a gear journaled on said frame, connected to the flow meter to be driven by the flow meter, and occupying a position generally above said base frame, a hollow rotatable housing, with sides surrounding said gear that project upwardly from the sides of said base housing, a clutch part journaled on said frame within said rotatable housing, and means connecting the clutch part to the gear whereby the clutch part rotates with the gear, multiple elongated selector members, generally radially disposed with respect to said gear, having an outer set of ends exposed on the outside of the rotatable housing, and each being movable toward and away from said gear by movement in a longitudinal direction produced by manipulation of its exposed end, another clutch part, one being provided for each of said selector members, mounted on each selector member, selected ones of said other clutch parts being moved to position adjacent said first-mentioned clutch part by rotation of said hollow housing, and said other clutch part of a selector member being engageable with said first-mentioned clutch part on movement of such other clutch part to said position of adjacency and on shifting of the selector member mounting the clutch toward said gear, a recorder mounted on said rotatable hollow housing, one for each selector member, and means connecting the recorder to the said other clutch part of the selector member associated with the recorder whereby rotation of the other clutch part, such as is produced by engagement with said first-mentioned clutch part, operates the recorder.

10. The fuel-distributing mechanism of claim 9, wherein a switch is mounted on said frame inside said hollow housing, and each selector member is provided with means for actuating said switch, when the other clutch part for the selector member is in said position adjacent said first-mentioned clutch part and on longitudinal shifting of the selector member to produce engagement of the two clutch parts.

References Cited by the Examiner

UNITED STATES PATENTS

| | | | |
|---|---|---|---|
| 2,963,200 | 12/1960 | Miller | 222—26 |
| 3,122,272 | 2/1964 | Marsh | 222—26 |

LOUIS J. DEMBO, *Primary Examiner.*

C. R. CARTER, *Assistant Examiner.*